M. H. HANSEN.
SCALE PAN AND HANGER.
APPLICATION FILED JUNE 7, 1916.
1,236,166.
Patented Aug. 7, 1917.
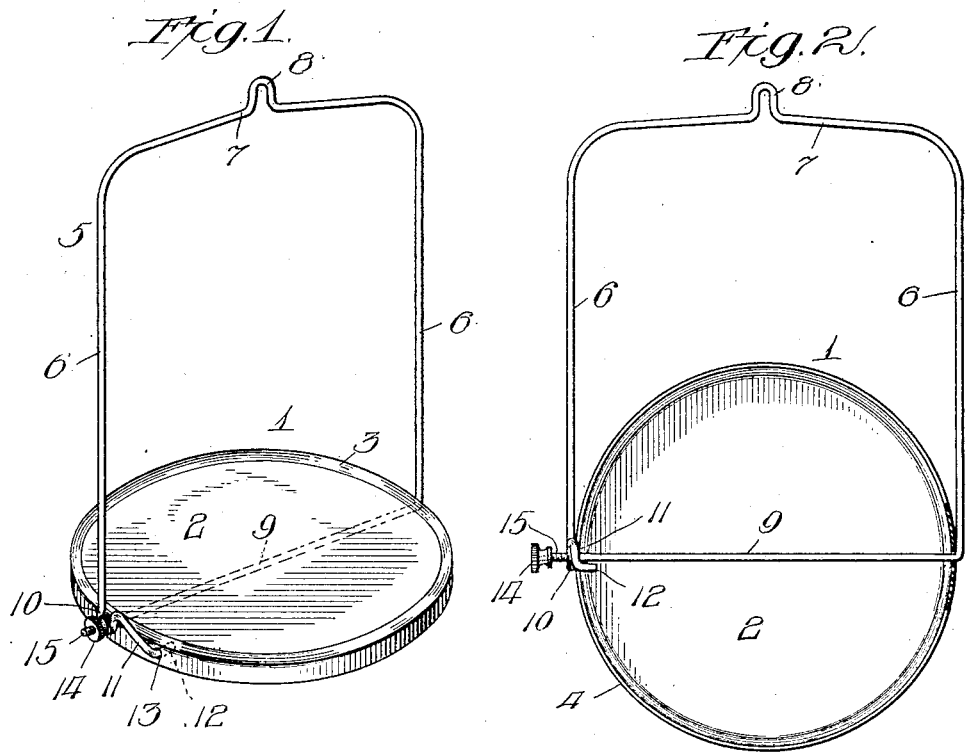
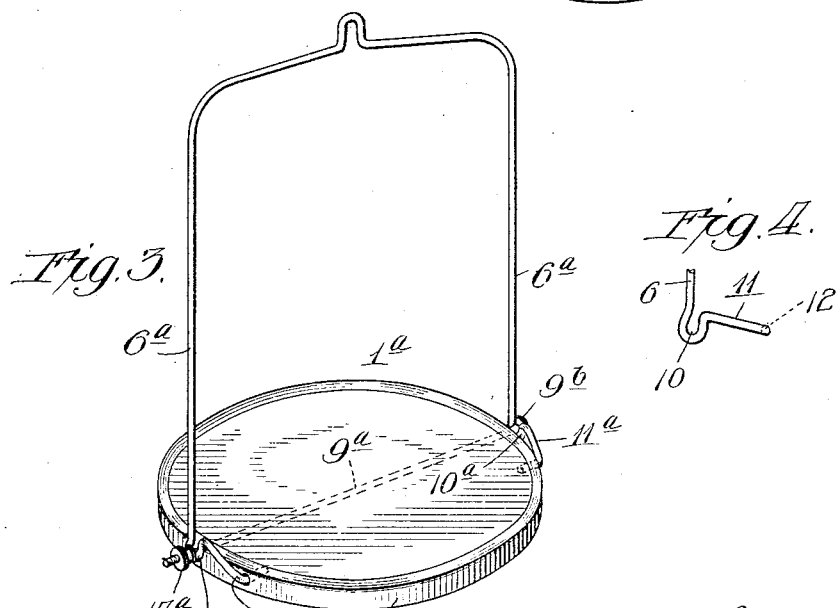
Witness:
Harry S. Gaither
Inventor:
Marius H. Hansen
By Miller Chindahl & Parker
Atty.

UNITED STATES PATENT OFFICE.

MARIUS H. HANSEN, OF CHICAGO, ILLINOIS.

SCALE-PAN AND HANGER.

1,236,166. Specification of Letters Patent. Patented Aug. 7, 1917.

Application filed June 7, 1916. Serial No. 102,120.

*To all whom it may concern:*

Be it known that I, MARIUS H. HANSEN, a citizen of the United States, residing at Chicago, in the county of Cook and State of Illinois, have invented certain new and useful Improvements in Scale-Pans and Hangers, of which the following is a specification.

This invention relates to scale pans of the type adapted to be suspended from a spring scale.

One of the objects of the invention is to provide a very simple and inexpensive construction of scale pan and hanger.

Another object of the invention is to produce a construction whereby the scale pan and its support will occupy but little space in storage or when not in use.

In the accompanying drawings, Figure 1 is a perspective view of a scale pan and hanger embodying the features of my invention, the parts being shown in operative relation. Fig. 2 is an elevation of the scale pan and hanger, the parts being disposed in position so as to occupy but little space. Fig. 3 is a perspective view of an alternative form of construction. Fig. 4 is a fragmental detail view of the hanger.

The embodiment shown in Fig. 1 comprises a pan which may be of any suitable shape, being herein shown as circular. It is indicated at 1. The pan is formed of sheet metal and comprises a disk 2 having a slightly raised rim 3 and a downwardly extending peripheral flange 4, all formed from an integral piece of sheet metal.

The hanger 5 comprises a loop formed of a rod or wire, said loop comprising side arms 6, a connecting portion 7 having a socket 8 to receive any suitable suspending device, and a transverse portion 9, all formed from a single piece of material. The transverse portion 9 is connected at one end to the lower end of one of the arms 6, the other end of said portion 9 extending through a socket 10 formed by bending the wire of which the other arm 6 is made.

At diametrically opposite points in the flange 4 of the scale pan 1 are openings through which the connecting portion 9 extends. To prevent the scale pan from revolving upon the connecting portion 9, I provide an arm 11 formed integral with the socket 10, said arm extending away from the adjacent arm 6 and being arranged to lie alongside the scale pan and having an inturned end 12 adapted to extend through an opening 13 in the flange 4.

If desired, means may be provided to keep the portion 9 and socket 10 in engagement with each other. Herein is shown a thumb-nut 14 screwed upon the end 15 of the connecting portion 9, said nut being adapted to be turned into contact with the adjacent arm 6.

When the angular end 12 of the arm 11 is in the opening 13, the pan 1 is supported in operative relation to the hanger 5. If it be desired to suspend the entire device upon the wall or otherwise store the device, the nut 14 may be unscrewed until the arm 6 can be sprung sidewise far enough to withdraw the end 12 from the opening 13, whereupon the pan 1 may be swung into the plane of the hanger 5, in which condition the entire device occupies but little space.

Fig. 3 shows an alternative construction, wherein a bolt 9$^a$ is substituted for the connecting portion 9. The lower ends of the arms 6$^a$ are provided with sockets 10$^a$ to receive the bolt 9$^a$. 9$^b$ indicates the head of the bolt, and 14$^a$ denotes a thumb-nut turned upon the opposite end of the bolt. 11$^a$ are arms similar to the arm 11 and connected to the lower ends of both arms 6$^a$. The arms 11$^a$ have inwardly bent ends to extend through openings in the flange 4$^a$ of the pan 1$^a$. If it be desired to swing the pan 1$^a$ into the plane of the arms 6$^a$, the nut 14 may be loosened or removed to permit the arms 11$^a$ to be disengaged from the pan.

It will be seen that the constructions herein described are very simple and inexpensive, and that they enable the pan and hanger to be relatively adjusted so as to occupy but little space.

I claim as my invention:

1. The combination, with a scale pan having openings, of a hanger formed of an integral piece of wire bent to provide two side arms, a suspending portion and a connecting portion, said connecting portion extending through said openings in the pan, said connecting portion being integrally connected at one end with one of the side arms and being connected with the other side arm, said hanger comprising an arm extending away from the adjacent side arm and engaging said pan to prevent rotation of the pan with relation to the hanger.

2. The combination, with a scale pan having diametrically opposite openings, of two side arms, a suspending portion connected to the upper ends of the side arms, a single member extending rotatably through said openings in the pan and connected at its ends with the side arms, and an arm connected to one of the side arms and engaging said pan to prevent rotation of the pan.

3. The combination, with a scale pan having openings, of two side arms adapted for suspension, a member connecting the lower ends of said arms, said member extending through said openings in the pan, one of said arms having at its lower end a bent portion forming a socket to receive said member, and an arm integral with the socket and engaging said pan.

4. The combination, with a scale pan formed of sheet metal and having an annular downwardly-extending flange, of two side arms adapted for suspension, said flange having openings, a connecting member extending through said openings in the flange, said connecting member being connected at each end with the lower ends of the side arms, and an arm extending away from the adjacent side arm and engaging in an opening in said flange.

In testimony whereof I have hereunto set my hand.

MARIUS H. HANSEN.

Copies of this patent may be obtained for five cents each, by addressing the "Commissioner of Patents, Washington, D. C."